(12) United States Patent
Okuda et al.

(10) Patent No.: US 6,270,866 B1
(45) Date of Patent: Aug. 7, 2001

(54) LOW TEMPERATURE HEAT SHRINKABLE FILM FOR LABELS

(75) Inventors: Tomohisa Okuda; Fusazo Wada; Hiroyuki Tanaka; Hiroki Kuriu, all of Moriyama (JP)

(73) Assignee: Gunze Limited, Kyoto (JP)

( * ) Notice: Subject to any disclaimer, the term of this patent is extended or adjusted under 35 U.S.C. 154(b) by 0 days.

(21) Appl. No.: 09/355,878

(22) PCT Filed: Oct. 28, 1998

(86) PCT No.: PCT/JP98/04872

§ 371 Date: Aug. 3, 1999

§ 102(e) Date: Aug. 3, 1999

(87) PCT Pub. No.: WO99/29490

PCT Pub. Date: Jun. 17, 1999

(30) Foreign Application Priority Data

Dec. 5, 1997 (JP) .................................................. 9-352206

(51) Int. Cl.⁷ .......................... B32B 27/08; B32B 27/32; B32B 27/36
(52) U.S. Cl. ....................... 428/35.1; 428/34.9; 428/35.7; 428/480; 428/515; 428/519; 428/521; 156/84
(58) Field of Search .................................. 428/34.9, 35.1, 428/35.7, 480, 500, 515, 516, 517, 519, 521, 523; 156/84, 1

(56) References Cited

FOREIGN PATENT DOCUMENTS

| 4161324 | 6/1992 | (JP) . |
| 5305664 | 11/1993 | (JP) . |
| 8323859 | 12/1996 | (JP) . |
| 9254257 | 9/1997 | (JP) . |
| 9272182 | 10/1997 | (JP) . |

OTHER PUBLICATIONS

Abstract of WO99/29490 Jun. 1999.

*Primary Examiner*—Vivian Chen
(74) *Attorney, Agent, or Firm*—Baker Botts L.L.P.

(57) ABSTRACT

The present invention provides a low temperature heat shrinkable film for labeling comprising at least one layer of a thermoplastic resin, in whose correlation diagram showing the relation between the heat shrinkage percentage Y at 80° C. in one direction and the heat shrinkage time t ($1 \leq t \leq 5$), the gradient Y' is in an area between the gradients satisfying Equations 1 and 2 and the heat shrinkage percentage Y is in an area between the heat shrinkage percentages satisfying Equations 3 and 4:

| $Y'=-1.05t^2+12.05t$ | (Equation 1) |
| $Y'=-0.30t^2+2.90t$ | (Equation 2) |
| $Y=-1.05t^2+12.05t+40$ | (Equation 3) |
| $Y=-0.30t^2+2.90t+9$ | (Equation 4) |

15 Claims, 5 Drawing Sheets

LOW TEMPERATURE HEAT SHRINKABLE FILM FOR LABELS

TECHNICAL FIELD

The present invention relates to heat shrinkable films for labeling, which are excellent in low temperature heat shrinking properties and UV absorbing properties.

BACKGROUND ART

It is a common practice to apply heat shrinkable films (labels) bearing printing on the internal surface to containers such as plastic containers for exhibiting product names, instructions for use and other information, or for decorative purposes (Japanese Unexamined Patent Publications Nos. 114380/1997 and 272182/1997).

Recently, however, there is remarkable increase in the number of plastic containers having low heat resistance and those made of thin sheets so as to facilitate recycling and decrease pollution caused by waste incineration. On the other hand, aseptic filling is becoming increasingly popular as a technique for filling containers. If a heat shrinkable film (label) is applied to an aseptically filled plastic container having low heat resistance or made of a thin sheet, there arises the problem that the container is markedly deformed when the film (label) is shrunk by the conventional wet heat at about 85 to 90° C. Further, some products need to be labeled at the lowest possible temperature to maintain their quality.

Accordingly, there is a strong demand for heat shrinkable films for labeling which show proper shrinking properties at low temperatures (70 to 84° C.).

Also demanded are low temperature heat shrinkable films for labeling which have UV absorbing properties (UV screening properties) to protect products prone to deterioration, change in quality or discoloration by UV light (such as medicines, foods, refined sake and like drinks, and cosmetics).

An object of the present invention is to provide a low temperature heat shrinkable film for labeling showing proper shrinking properties at low temperatures (70 to 84° C.).

Another object of the invention is to provide a low temperature heat shrinkable film for labeling comprising a specific resin system.

A further object of the invention is to provide a low temperature heat shrinkable film for labeling having excellent UV absorbing properties.

SUMMARY OF THE INVENTION

The present inventors did extensive research to achieve the above objects and found that these objects can be accomplished by a heat shrinkable film comprising at least one layer of a thermoplastic resin, in whose correlation diagram showing the relation between the heat shrinkage percentage Y at 80° C. in one direction (orientation direction) and the heat shrinkage time t (sec) ($1 \leq t \leq 5$), the gradient Y' is in the area (hereinafter referred to as "Area A") between the gradients satisfying Equations 1 and Equation 2 and the heat shrinkage percentage Y is in the area (hereinafter referred to as "Area B") between the heat shrinkage percentages satisfying Equations 3 and 4.

$$Y'=-1.05t^2+12.05t \quad \text{(Equation 1)}$$

$$Y'=-0.30t^2+2.90t \quad \text{(Equation 2)}$$

$$Y=-1.05t^2+12.05t+40 \quad \text{(Equation 3)}$$

$$Y=-0.30t^2+2.90t+9 \quad \text{(Equation 4)}$$

Figure 1:
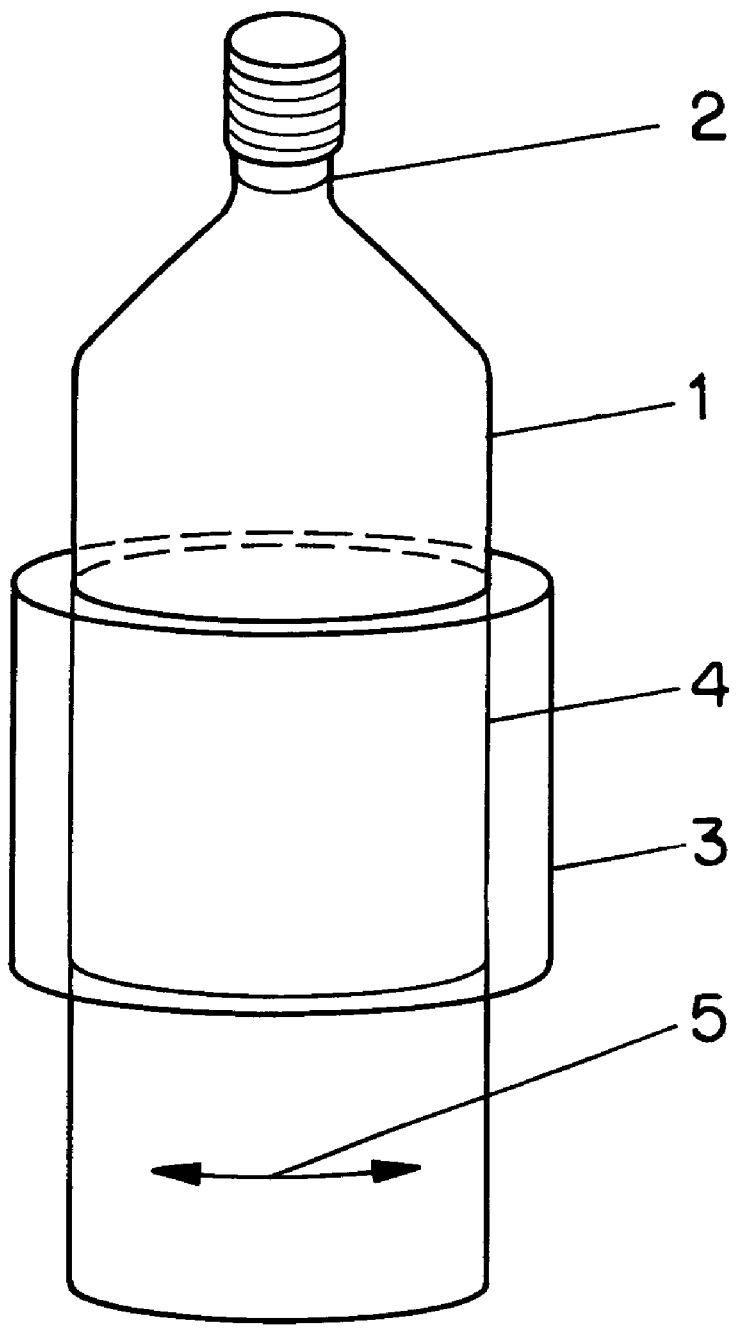
FIG. 1 is a schematic illustration of a label applied to a container having a fill point, wherein 1 indicates a container; 2, a filling point; 3, a label before heat shrinkage; 4, a label after heat shrinkage; and 5, the main orientation direction of the film.
Figure 2:
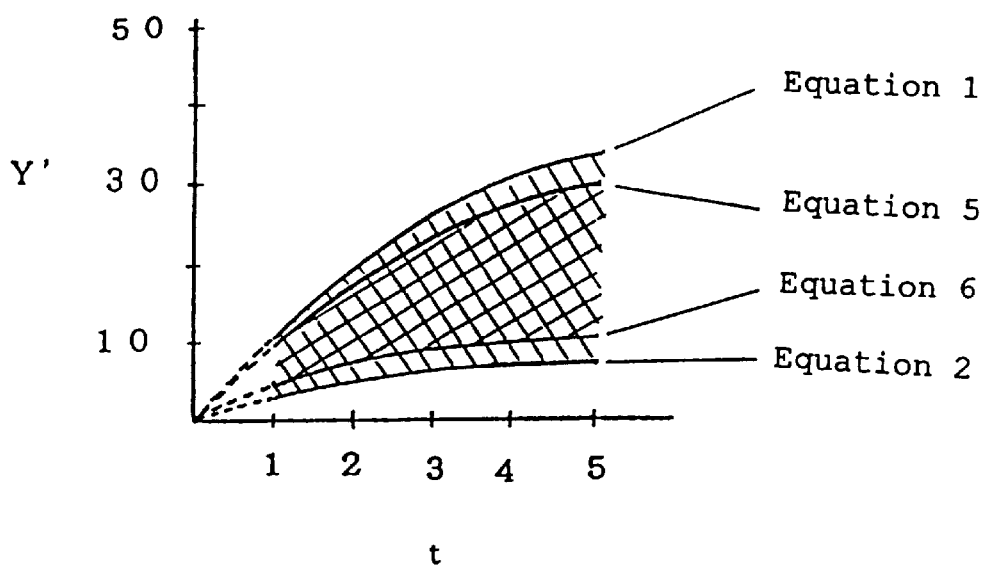
FIG. 2 is a diagram showing gradients Y' satisfying Equations 1, 2, 5 and 6, respectively. The gradient Y' according to the invention is in the area between the gradients of Equations 1 and 2, more preferably in the area between the gradients of Equations 5 and 6.
Figure 3:
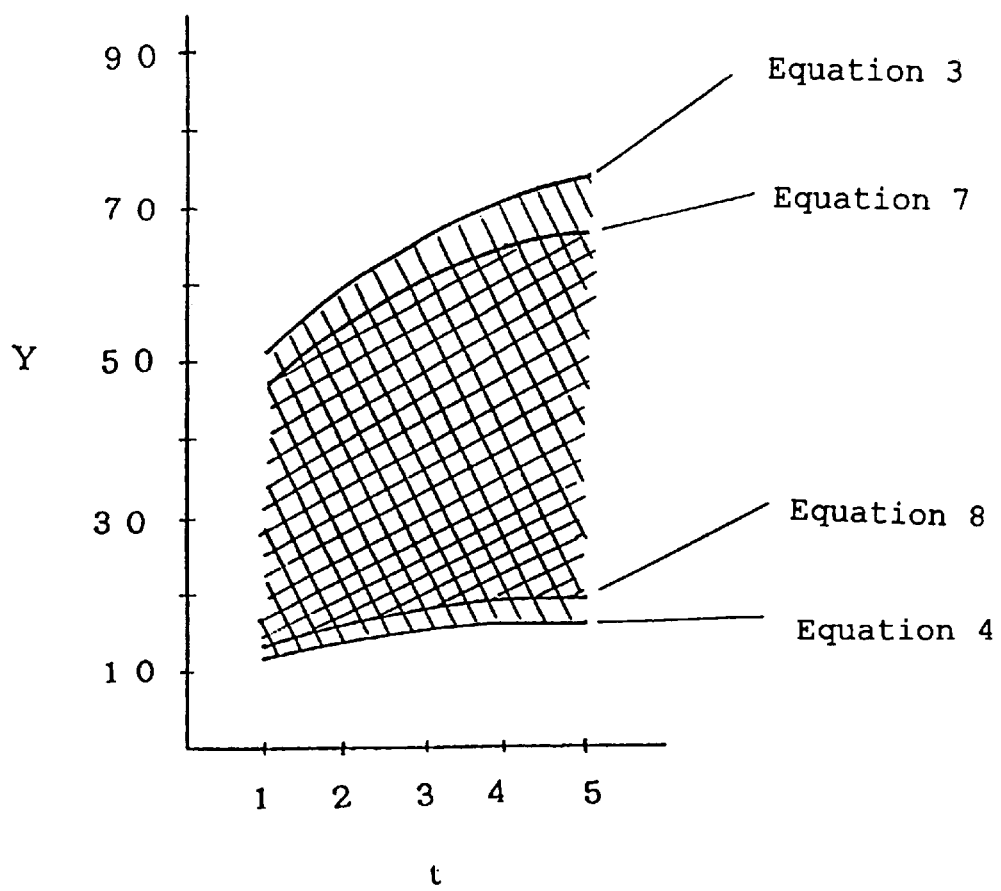
FIG. 3 is a diagram showing heat shrinkage percentages Y satisfying Equations 3, 4, 7 and 8, respectively. The heat shrinkage percentage Y according to the invention is in the area between the heat shrinkage percentages of Equations 3 and 4, more preferably in the area between the heat shrinkage percentages of Equations 7 and 8.

The present invention provide a low temperature heat shrinkable film for labeling comprising at least one layer of a thermoplastic resin, in whose correlation diagram showing the relation between the heat shrinkage percentage Y at 80° C. and the heat shrinkage time t ($1 \leq t \leq 5$), the gradient Y' is in Area A (see FIG. 2) and the heat shrinkage percentage Y is in Area B (see FIG. 3).

The present invention also provides a film containing a thermoplastic polyester resin.

The present invention further provides a film comprising an intermediate layer (B) comprising at least one resin selected from the group consisting of polystyrene resins, high impact polystyrene resins and high impact graft polystyrene resins, and inner and outer layers (A) and (C) each comprising a resin system mainly comprising a styrene-butadiene block copolymer, the layers being laminated in the order (A)/(B)/(C).

The present invention further provides the above film wherein the inner and outer layers (A) and (C) each contain a mixed resin system of 100 parts by weight of a styrene-butadiene block copolymer having a butadiene content of 10 to 40 wt. % and 2 to 100 parts by weight of a polystyrene resin.

The present invention also provides the above film wherein the intermediate layer (B) further contains a UV absorber.

The present invention also provides the above film having a maximum light transmission of 25% or less, preferably 20% or less, more preferably 15% or less, in the wavelength range of 250 to 380 nm.

The heat shrinkable film for labeling according to the invention can be preferably applied to containers amenable to labeling by heat shrinkage at low temperatures (70 to 84° C.). Examples of such containers include plastic containers having low heat resistance or made of thin sheets (such as polystyrene containers, polyethylene containers and PET containers for aseptic filling) which are deformed at 85° C. or higher, and containers which are preferred to be labeled by heat shrinkage at low temperatures (70 to 84° C.) in order to maintain the quality of the contents.

When a tubular heat shrinkable film (label) is placed around a container and heat shrunk, the shrinkage percentage with respect to shrinkage time (i.e., shrinkage rate) greatly affects the finish conditions of the label. Further, plastic containers having low heat resistance or made of thin sheets need to be labeled at a low temperature within a short period of time. That is, the temperature and time for shrinkage, and shrinkage percentage are factors that may combine to cause defects such as insufficient shrinkage, pockmarks, wrinkles and tucking of the film and deformation of the container. The heat shrinkable film described above does not produce such defects and can be tightly affixed to the container by heat shrinkage.

In the correlation diagrams (FIGS. 2 and 3) showing the relation between the heat shrinkage percentage Y and the heat shrinkage time t ($1 \leq t \leq 5$), if the gradient Y' exceeds the gradient satisfying Equation 1, or if the heat shrinkage percentage Y exceeds the heat shrinkage percentage satisfying Equation 3, the film shrinks too rapidly when heated and is likely to cause defects such as uneven shrinkage, pockmarks and tucking of the films. On the other hand, if the gradient Y' is less than the gradient satisfying Equation 2, or if the heat shrinkage percentage Y is less than the heat shrinkage percentage satisfying Equation 4, defects such as insufficient shrinkage or wrinkles of the film may occur, failing to produce a good finish.

The upper limit of the gradient Y' that produces a good finish is the gradient satisfying Equation 1, preferably Equation 5, in FIG. 2. The lower limit of the gradient Y' is the gradient satisfying Equation 2, preferably Equation 6, in FIG. 2.

Further, the upper limit of the heat shrinkage percentage Y is the heat shrinkage percentage satisfying Equation 3, preferably Equation 7, in FIG. 3. The lower limit of the heat shrinkage percentage Y is the heat shrinkage percentage satisfying Equation 4, preferably Equation 8, in FIG. 4.

$Y'=-1.05t^2+12.05t$ (Equation 1)

$Y'=-1.00t^2+11.00t$ (Equation 5)

$Y'=-0.30t^2+2.90t$ (Equation 2)

$Y'=-0.50t^2+4.50t$ (Equation 6)

$Y=-1.05t^2+12.05t+40$ (Equation 3)

$Y=-1.00t^2+11.00t+37$ (Equation 7)

$Y=-0.30t^2+2.90t+9$ (Equation 4)

$Y=-0.50t^2+4.50t+9$ (Equation 8)

The low temperature heat shrinkable film for labeling according to the invention can be prepared from a themoplastic resin, in particular a polystyrene resin. Preferred films include those comprising an intermediate layer (B) containing at least one resin selected from the group consisting of polystyrene resins, high impact polystyrene resins and high impact graft polystyrene resins, and inner and outer layers (A) and (C) each containing a resin system mainly comprising a styrene-butadiene block copolymer, the layers being laminated in the order (A)/(B)/(C).

The polystyrene resins usable in the invention include homopolymers and copolymers of styrene, α-methyl styrene, p-methyl styrene and other styrene derivatives; copolymers of styrene or styrene derivatives and other monomers copolymerizable therewith, such as acrylic acid, methacrylic acid, their metal salts (e.g., Na, K, Li, Mg, Ca, Zn and Fe), acrylic acid esters, methacrylic acid esters, other aliphatic unsaturated carboxylic acids, and their derivatives.

The high impact graft polystyrene resin is a styrene resin basically comprising a continuous phase of any of the above styrene resins and particles of rubber-like polymer dispersed the continuous phase, the rubber-like polymer having the styrene resin incorporated therein and grafted to the rubber component such as polybutadiene.

The high impact polystyrene resin is a mixture of polystyrene and a synthetic rubber such as polybutadiene or polyisoprene, or a copolymer obtained by graft polymerization of styrene and a synthetic rubber such as polybutadiene or polyisoprene.

The layers for forming the film can be laminated by any conventional methods such as dry lamination and extrusion lamination, among which co-extrusion lamination is simple and thus preferable. Co-extrusion lamination can be performed using a T die to produce a flat film, or using a die to prepare a tubular film which is then cut into a flat film.

The inner and outer layers (A) and (C) and the intermediate layer (B) may contain, within the range that does not adversely affect their properties, other resins such as polyethylenes (including copolymers comprising ethylene as a main component and propylene, butene-1, vinyl acetate or like monomer), polypropylenes (including copolymers comprising propylene as a main component and ethylene, butene-1 or like monomer) and other polyolefin resins, thermoplastic elastomers (e.g., block copolymerization elastomers comprising polystyrene block and polybutadiene block), rubbers and hydrocarbon resins. Further, each layer may contain any of various additives, such as fillers, heat stabilizers, antioxidants, antistatic agents, lubricants, nucleating agents, flame retardants and coloring agents.

Thermoplastic resins usable in the invention include polyester resins, polystyrene resins, high impact polystyrene resins, high impact graft polystyrene resins and like polystyrene resins, polyethylenes, polypropylenes and like polyolefins, and polyvinyl chloride resins.

The inner and outer layers (A) and (C) may be surface-treated to improve printability. The surface treatment may be performed by any conventional methods, among which corona discharge treatment, plasma treatment and flame treatment are simple and thus preferable.

The thickness of the intermediate layer (B) accounts for 5 to 95%, preferably 40 to 95%, more preferably 65 to 85%, of the total thickness of the film.

The inner layer (A) and outer layer (C) may be the same or different in composition.

The film may contain, in addition to the layers (A)/(B)/(C), one or more layers to form, for example, a structure (A)/(B)/(A)/(B)/(C). Further, the internal or external surface of at least one of layers (A) and (C) may be provided with a layer of a resin such as polyethylene (which may be a copolymer such as an ethylene-vinyl acetate copolymer), polypropylene (which may be a copolymer such as a propylene-butene-1 copolymer) or like polyolefin resin or polyester resin, optionally via an adhesive layer.

It is more preferable that the inner and outer layers (A) and (C) each comprise a mixed resin system of the polystyrene resin and a styrene-butadiene block copolymer having a MI (melt index) of 0.5 to 10 and a butadiene content of 10 to 40 wt. % (preferably 20 to 30 wt. %, more preferably 23 to 27 wt. %).

The styrene-butadiene block copolymer for use in the invention is a copolymer comprising styrene blocks and butadiene blocks. Examples of such copolymers include S—B—S and (S—B)n-S, wherein S is a styrene block, B is a butadiene block and n is an integer of 2 or more. Also usable are those wherein part of residual double bonds have been hydrogenated.

The mixing ratio of the polystyrene resin to the block copolymer is 2 to 100 parts by weight, preferably 7 to 50 parts by weight, more preferably 12 to 25 parts by weight of the polystyrene resin, to 100 parts by weight of the block copolymer.

The inner layer (A) and outer layer (C) may be different from each other in MI, butadiene content, polystyrene resin content or thickness. It is preferable, however, that the inner and outer layers are equivalent in these values, from the viewpoint of prevention of curling of the film.

Further, terpolymers and tetrapolymers containing other component as well as the styrene-butadiene block copolymer, can be used in the present invention. Examples of other components include acrylic acid, methacrylic acid and their metal salts (e.g., Na, K, Li, Mg, Ca, Zn and Fe), acrylic acid esters, methacrylic acid esters, other aliphatic carboxylic acids and their derivatives. When the terpolymer or tetrapolymer is used, the butadiene content and the amount of the polystyrene resin to be added are preferably the same as in the case where the styrene-butadiene block copolymer is used.

The film comprising the layers (A)/(B)/(C) is rendered heat shrinkable by orientating it in the desired direction of heat shrinkability (and in the direction perpendicular to said direction, where necessary).

As used herein, the heat shrinkage direction (one direction) of the heat shrinkage percentage Y is the orientation direction when the film is monoaxially orientated. or the direction of a higher orientation ratio when the film is biaxially orientated simultaneously or sequentially.

An embodiment of the process for producing the laminate film of the invention will be specifically described below. Using three extruders, resins for forming the inner layer (A), intermediate layer (B) and outer layer (C), are respectively melted, and the molten resins are laminated by fusing in one T die. The laminate film is extruded from the T die, taken off with a take-off roll, orientated with nip rolls in the machine direction, orientated with a tenter in the transverse direction, annealed, cooled and wound up with a wind-up roll, to thereby obtain a heat shrinkable film. (The film may be orientated in only one of the machine and transverse directions.)

The heat shrinkable film of the invention is 10 to 150 μm thick, usually 20 to 70 μm thick.

The heat shrinkage percentage (heat shrinkage rate) is determined by types and proportions of the resins constituting the film, film thickness, extrusion temperature, draw ratio, take-off temperature, orientation ratio, orientation rate, orientation temperature, annealing conditions and cooling conditions, all of which are closely related with one another. By selecting suitable conditions, the low temperature heat shrinkable film of the invention can be obtained, in whose correlation diagram showing the relation between the heat shrinkage percentage Y at 80° C. in one direction and the heat shrinkage time t ($1 \leq t \leq 5$), the gradient Y' is in Area A and the heat shrinkage percentage Y is in Area B. Preferred conditions are described in the following Example 1.

In the film having the structure (A)/(B)/(C), the inner and outer layers (A) and (C) chiefly serve to impart suitable shrinking properties at low temperatures (70 to 84° C.) and improve impact resistance, and the intermediate layer (B) to improve stiffness and decrease the natural shrinkage percentage (to 2% or less).

The natural shrinkage percentage of the film of the invention is preferably 2% or less, more preferably 1.5% or less.

The layer (B) may contain a styrene-butadiene block copolymer, and the film may have a structure (B)/(A)/(B), instead of (A)/(B)/(C).

A UV absorber may be added for imparting UV absorbing properties to the film. Useful UV absorbers are not limited and include known UV absorbers such as 2,2-hydroxy-5-methylphenylbenzotriazole, 2,2-hydroxy-3-t-butyl-5-methylphenyl-5-chlorobenzotriazole, 2,2-hydroxy-3',5'-di-t-butylphenyl-5-chlorobenzotriazole and like benzotriazole UV absorbers; 2-hydroxy-4-methylbenzophenone and like benzophenone UV absorbers; 2,4-di-t-butylphenyl-3,5-di-butyl-4-hydroxybenzoate and like hydroxybenzoate UV absorbers; and titanium oxide and like inorganic fine particles. These UV absorbers may be used singly or in combination. Benzotriazole UV absorbers are particularly effective and thus preferable.

UV absorbing properties required of the film vary according to the product to be labeled for sale or distribution, but generally, the film has a maximum light transmission of 25% or less, preferably 15% or less, in the wavelength range of 250 to 380 nm. The UV absorber is added in an amount that can achieve the above effect, i.e., usually in an amount of 0.05 to 2 parts by weight per 100 parts by weight of the film.

The UV absorber can be added to at least one of the inner and outer layers (A) and (C) and intermediate layers (B). It is more preferable to add the UV absorber only to the intermediate layer (B), since, in that case, the inner and outer layers (A) and (C) serve as screen layers and prevent the UV absorber from diffusing during extrusion or orientation of the film, thus making it possible to impart sufficient properties by addition of only a small amount of the UV absorber.

The low temperature heat shrinkable film thus obtained is provided with printing on the surface of the inner layer, made into a tube having a printed internal surface by center sealing, and cut in a proper length to give a label. The label is placed around a plastic container having low heat resistance or made of a thin sheet, and heat shrunk at a low temperature, whereby the contemplated results can be achieved.

When the label has UV absorbing properties, the label covers preferably the whole surface of the container except for the minimum areas in the opening portion and bottom portion, so that the highest effect can be achieved.

The low temperature heat shrinkable film of the invention can be also prepared from a layer of a polystyrene resin. The polystyrene resin is not limited, and the above resins for use in the layers (A), (B) and (C) can be preferably used.

The low temperature heat shrinkable film can be obtained, in whose correlation diagram showing the relation between the heat shrinkage percentage Y at 80° C. in one direction and the heat shrinkage time t ($1 \leq t \leq 5$), the gradient Y' is in Area A and the heat shrinkage percentage Y is in Area B, by suitably selecting types and proportions of resins, film thickness, extrusion temperature, draw ratio, take-off temperature, preliminary heating conditions, orientation ratio, orientation rate, orientation temperature, annealing conditions and cooling conditions.

UV absorbing properties can be imparted to the film by adding a necessary amount of the above UV absorber.

The low temperature heat shrinkable film of the invention can be also prepared from a thermoplastic polyester resin.

Preferred thermoplastic polyester resins include those mainly comprising a copolymerized polyester resin. The acid components forming the copolymerized polyester resins may be known acids, such as terephtharic acid, isophthalic acid, phthalic acid, 2,6-naphthalenedicarboxylic acid and like naphthalene dicarboxylic acids; diphenyl 4,4'-dicarboxylate and like dicarboxybiphenyls; 5-t-butylisophthalic acid and like substituted phthalic acids; 2,2,6,6-tetramethylbiphenyl-4,4'-dicarboxylic acid and like substituted dicarboxybiphenyls; 1,1,3-trimethyl-3-phenylindene-4,5-dicarboxylic acid and its substitution products; 1,2-diphenoxyethane-4,4'-dicarboxylic acid, its substitution products and like aromatic dicarboxylic acids; oxalic acid, malonic acid, succinic acid, glutaric acid, adipic acid, azelaic acid, sebacic acid, pimelic acid, suberic acid, undecanoic acid, dodecanedicarboxylic acid, brasylic acid, tetradecanedicarboxylic acid, thapsinic acid, nonadecanedicarboxylic acid, docholinedicarboxylic acid and like aliphatic dicarboxylic acids, and their substitution products; and 4,4'-dicarboxycyclohexane and like alicyclic dicarboxylic acids and their substitution products. Useful diol components include known diols, such as ethylene glycol, triethylene glycol, propylene glycol, butanediol, 1,6-hexanediol, 1,10-decanediol, neopentyl glycol, 2-methyl-2-ethyl-1,3-propanediol, 2-diethyl-1,3-propanediol, 2-ethyl-2-n-butyl-1,3-propanediol and like aliphatic diols; 1,3-cyclohexanedimethanol, 1,4-cyclohexanedimethanol and like alicyclic diols; ethylene oxide adducts of bisphenol compounds such as 2,2-bis(4'-β-hydroxyethoxydiphenyl) propane and bis(4'-β-hydroxyethoxyphenyl)sulfone; xylylene glycol and like aromatic diols; and diethylene glycol.

The copolymerized polyester resins may be used singly or in combination, or as mixed with a small amount of a polyethylene terephthalate resin, polybutylene terephthalate resin or the like.

The low temperature heat shrinkable film can be obtained, in whose correlation diagram showing the relation between the heat shrinkage percentage Y at 80° C. in one direction and the heat shrinkage time t ($1 \leq t \leq 5$), the gradient Y' is in Area A and the heat shrinkage percentage Y is in Area B, by suitably selecting types and proportions of resins, film thickness, extrusion temperature, draw ratio, take-off temperature, preliminary heating conditions, orientation ratio, orientation rate, orientation temperature, annealing conditions and cooling conditions. Preferred conditions are, for example, those described in the following Example 3.

The heat shrinkable film of the invention comprising the themoplastic polyester resin not only is capable of forming a label with proper shrinkage properties at low temperatures but also has excellent impact resistance, good stiffness and low natural shrinkage percentage of 2% or less, owing to the properties of the resin.

UV absorbing properties can be imparted to the film by adding a necessary amount of the above UV absorber.

The low temperature heat shrinkable film of the invention can be also prepared from a polyvinyl chloride resin. The polyvinyl chloride resin is not limited, but is preferably a composition comprising 100 parts by weight of a homogeneous polyvinyl chloride resin with a polymerization degree of 750 to 800, 6 to 6.5 parts by weight of a plasticizer (such as dioctyl adipate), 9 to 10 parts by weight of an impact modifier (ABS resin) and a small amount of a stabilizer.

The low temperature heat. shrinkable film can be obtained, in whose correlation diagram showing the relation between the heat shrinkage percentage Y at 80° C. in one direction and the heat shrinkage time t ($1 \leq t \leq 5$), the gradient Y' is in Area A and the heat shrinkage percentage Y is in Area B, by suitably selecting types and proportions of resins, film thickness, extrusion temperature, draw ratio, take-off temperature, preliminary heating conditions, orientation ratio, orientation rate, orientation temperature, annealing conditions and cooling conditions.

UV absorbing properties can be imparted to the film by adding a necessary amount of the above UV absorber.

In the correlation diagram showing the relation. between the heat shrinkage percentage Y and the shrinkage time t according to the invention, the heat shrinkage time t is equal to or less than 5, because the finish conditions of shrunk labels are determined in 5 seconds or less of heat shrinkage time. Accordingly, labeled containers may be in the shrink tunnel for a period exceeding 5 seconds, on condition that the deformation of the container be within an acceptable range. Similarly, the film of the invention can be shrunk by heating at a temperature exceeding 84° C., depending on the type of the container to be which the film is applied.

The heat shrinkable film of the invention is heat shrunk preferably at 70 to 84° C. for about 4 to 5 seconds. The heat shrinkage percentage of the film of the invention is about 15 to 75%, preferably about 20 to 65%.

DETAILED DESCRIPTION OF THE PREFERRED EMBODIMENTS

Typical embodiments of the present invention are given below to illustrate the invention in further detail.

The following methods were employed for obtaining the correlation diagram showing the relation between the heat shrinkage percentage Y at 80° C. in one direction and the heat shrinkage time t ($1 \leq t \leq 5$), measuring the property values, and evaluating the test results.

The correlation diagram showing the heat shrinkage percentage Y at 80° C. in one direction and the shrinkage time t ($1 \leq t \leq 5$) was obtained by the following method.

First, 30 samples, each measuring 100 mm×100 mm, were cut out from the heat shrinkable film.

One of the samples was immersed in a water bath at 80° C. for 1 second and immediately cooled with cold water. Then measured was the length L (mm) in the machine or transverse direction (the direction to become parallel to the circumferential direction of the container at the time of application of the film, the direction being hereinafter referred to as "main orientation direction"). Subsequently, the heat shrinkage percentage was found by subtracting L from 100. The same procedure was repeated using nine of the remaining samples to find the average heat shrinkage percentage of the 10 samples. The obtained value was used as the heat shrinkage percentage Y when t was 1. The heat shrinkage percentage Y when t was 3 and the heat shrinkage percentage Y when t was 5 were found by similar procedures.

Then, the values of a, b and c were found by substituting the value of Y when t was 1, value of Y when t was 3, and value of Y when t was 5, for Y in the equation $Y=at^2+bt+c$, whereby the relational expression can be obtained.

The correlation diagram of the gradient Y' and the shrinkage time t was obtained by plotting Y−c(=Y') along the ordinate axis and t along the abscissa axis, within the range $1 \leq t \leq 5$. Further, the correlation diagram of the heat shrinkage percentage Y and the heat shrinkage time t was obtained by plotting Y along the ordinate axis and t along the abscissa axis.

Figure 4:
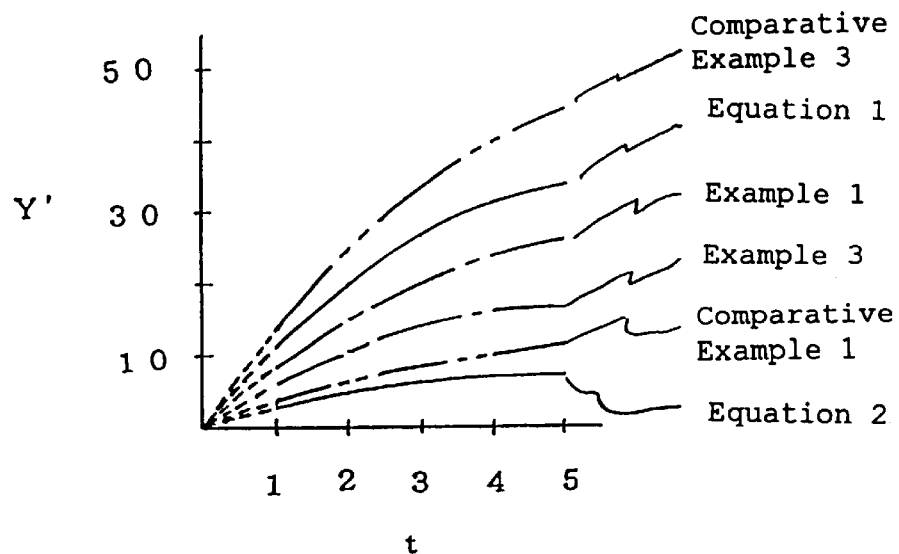
FIG. 4 is a correlation diagram showing the gradients Y' satisfying Equations 1, 2, 9, 10, 11 and 12, respectively.

FIG. 2 shows the area in which the gradient Y' according to the present invention lies, the area being defined by Equations 1 and 2 and Equations 5 and 6. FIG. 4 shows the correlation diagram of Equations 1 and 2, respectively.

Figure 5:
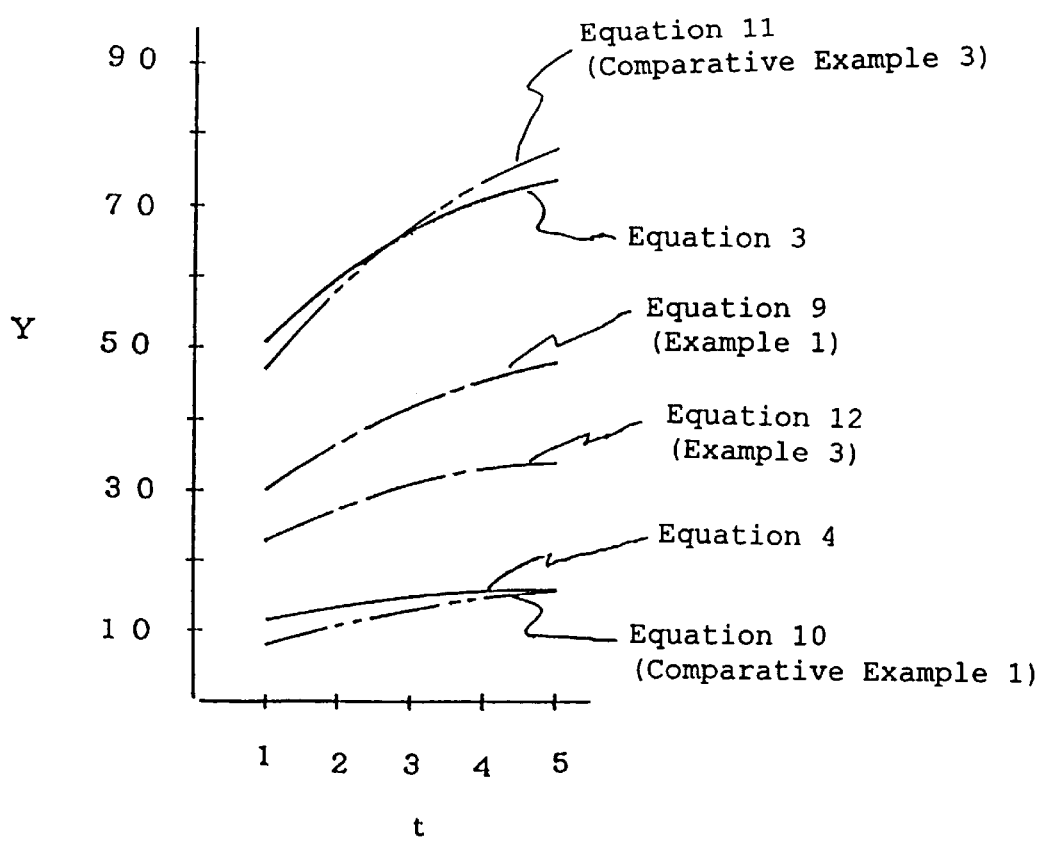
FIG. 5 is a correlation diagram showing the heat shrinkage percentages Y satisfying Equations 3, 4, 9, 10, 11 and 12, respectively.

FIG. 3 shows the area in which the heat shrinkage percentage Y according to the invention lies, the area being defined by Equations 3 and 4, and Equations 7 and 8. FIG. 5 shows the correlation diagram of Equations 3 and 4, respectively.

The natural shrinkage percentage of the film was determined by allowing the film at 40° C. for 7 days and measuring the shrinkage percentage in the main orientation direction.

The maximum light transmission in the wavelength range of 250 to 380 nm was determined using a spectrophotometer "U-3410" manufactured by Hitachi, Ltd.

The finish conditions of the shrunk label were observed, and evaluated as good when the label was smooth and had no defects, and as poor when the label had any defects.

The change in height of the filling point (unit: mm) was determined using a PET bottle having a cylindrical body, by subtracting the distance between the fill point and the bottom before the heat shrinkage process, from said distance after the heat shrinkage process. The greater the determined value, the greater the degree of heat deformation of the PET bottle.

EXAMPLE 1

In each of two extruders was melted a resin system for the outer and inner layers (A) and (C) consisting of 100 parts by weight of a styrene-butadiene block copolymer having a structure (S—B)$_2$—S and a butadiene content of 25 wt.%, and 18 parts by weight of a styrene monopolymer. In another extruder was melted a resin system for the intermediate layer (B) consisting of 100 parts by weight of a high impact graft polystyrene resin ("Asahi Chemical Polystyrene SS-700" manufactured by Asahi Chemical Industry Co., Ltd.), 8 parts by weight of an elastomer resin ("Toughprene 126" manufactured by Asahi Chemical Industry Co., Ltd.) and 0.3 parts by weight of 2,2-hydroxy-3-t-butyl-5-methylphenyl-5-chlorobenzotriazole. The molten resin systems were laminated by fusing in one T die at 195° C. so as to give a film consisting of layers (A)/(B)/(C) in this order, which was then extruded from the T die, and taken off at a draw ratio of 118% with a take-off roll at 25° C. The film was orientated 1.4 times in the machine direction using an orientation roll at 85° C. and an orientation rate of 365%/min, preliminarily heated at 115° C. for 6 seconds, and orientated 5 times in the transverse direction using a tenter at a first zone temperature of 105° C., a second zone temperature of 93° C. and an orientation rate of 5330%/min. The orientated film was then annealed in the vicinity of the exit of the tenter at 98° C. over a period of 2.5 seconds while relaxing the film by 1% in the widthwise direction, and subjected to primary cooling with air at 75° C. and then to secondary cooling with a cooling roll at 30° C.

In the obtained film, the inner and outer layers (A) and (C) were each 9 μm thick. and the intermediate layer (B) 42 μm thick. The total thickness of the film was 60 μm.

Figure 6:
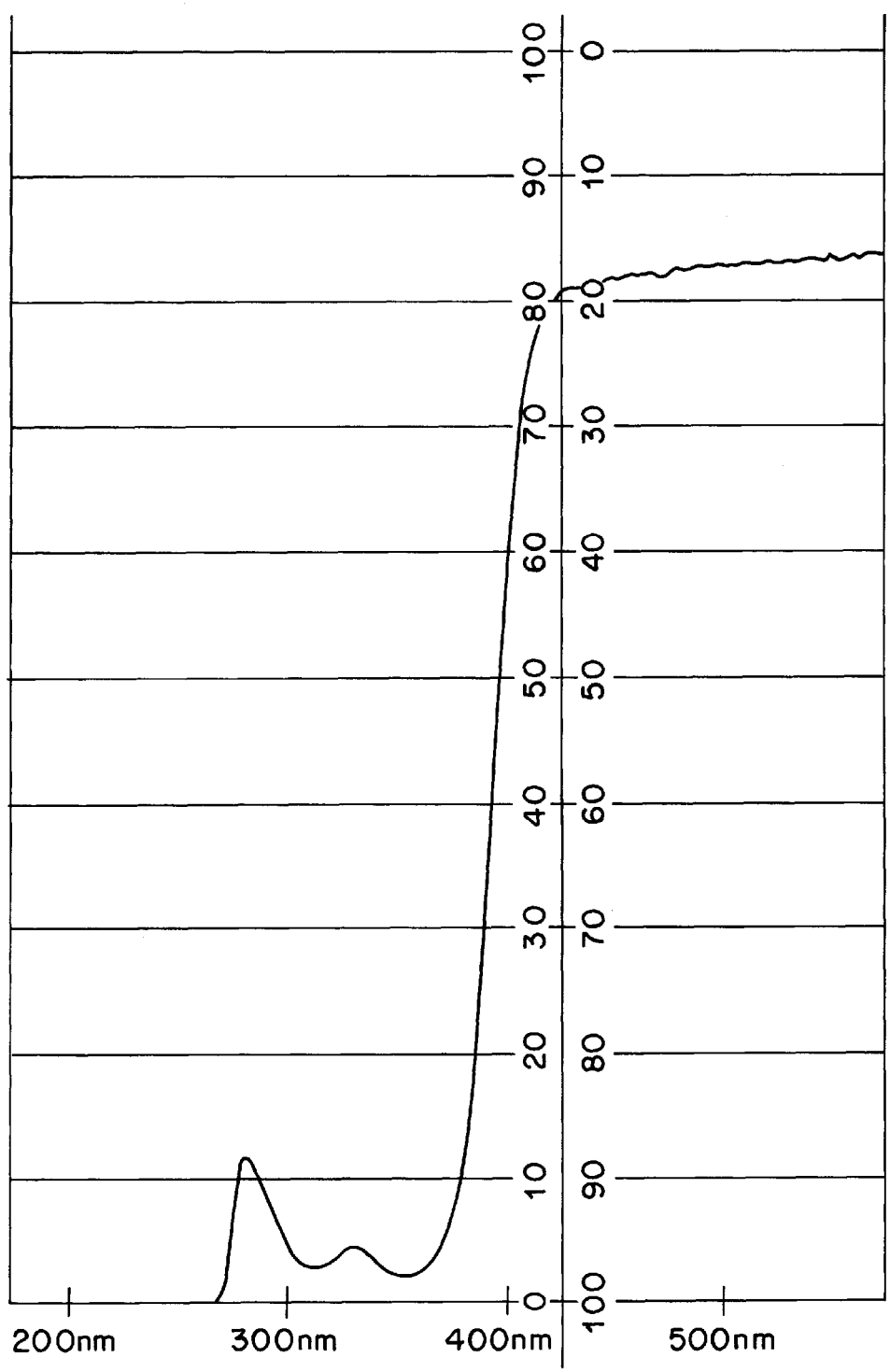
FIG. 6 is a chart showing the results of spectrophotometric determination of the transmission of UV light (and a slight amount of visible light) through the film obtained in Example 1.
Figure 7:
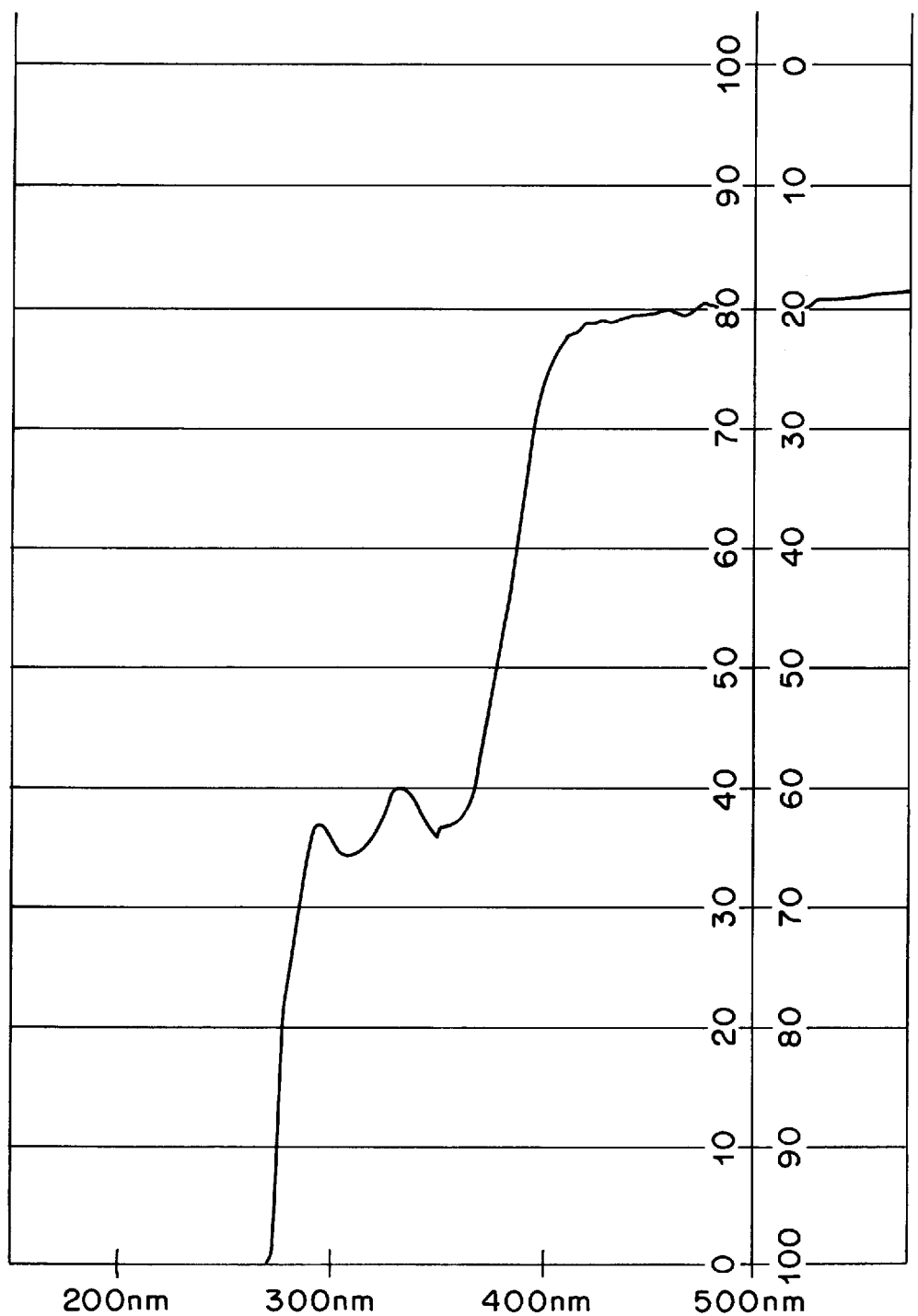
FIG. 7 is a chart showing the results of spectrophotometric determination of the transmission of UV light through the film obtained by following the procedure of Example 1 with the exception of not using the UV absorber.

The film had a natural shrinkage percentage of 1%, and a maximum light transmission of 12% in the wavelength range of 250 to 380 nm. The results of spectrophotometric determination are shown in FIGS. 6 and 7. (FIG. 6 shows the determination results of the film obtained in Example 1, and FIG. 7 shows, for reference, those of the film obtained by repeating the procedure of Example 1 except that the UV absorber was not used.) The relation between the heat shrinkage percentage Y and heat shrinkage time t of the obtained film is expressed by the following Equation 9. FIG. 5 shows the correlation diagram of Equation 9, and FIG. 4 the correlation diagram of the gradient Y'. FIGS. 4 and 5 reveal that Equation 9 is in both Areas A and B according to the invention.

$$Y' = -0.750t^2 + 9.00t + 21.750 \quad \text{(Equation 9)}$$

Subsequently, the surface of the layer (A) of the heat shrinkable film was provided with five-color photogravure using a photogravure printing machine.

Then, using an organic solvent, the film was made into a tube having an internal diameter of 71 mm by center sealing, so that the surface of the layer (A) became the internal surface and the transverse direction of the film became parallel to the circumferential direction of the container. The resulting tubular film was cut in a length of 64 mm to obtain a label.

EXAMPLE 2

A PET bottle for aseptic filling having a cylindrical body with an external diameter of 62.88 mm and a length of 170 mm and a fill point at a height of 172.8 mm from the bottom, was filled with water to the fill point, and sealed with a cap. The bottle was then covered with the label obtained in Example 1, and passed through a wet heat shrink tunnel (length: 3 m, vapor pressure: 0.3 kg/cm2) for heat shrinking the label at 80° C. for 5 seconds.

Table 1 shows the finish conditions of the shrunk label and change in height of the fill point.

Comparative Example 1

A heat shrinkable film was prepared in the following manner, using a resin system for the inner and outer layers (A) and (C) consisting of 100 parts by weight of a styrene-butadiene block copolymer having a structure (S—B)$_2$—S and a butadiene content of 20% and 50 parts by weight of a polystyrene resin, and a resin system for the intermediate layer (B) consisting of 100 parts by weight of a high impact graft polystyrene resin ("Asahi Chemical Polystyrene SS-700" manufactured by Asahi Chemical Industry Co., Ltd.) and 10 parts by weight of a polystyrene resin. The resin systems were laminated using the same film forming apparatus as used in Example 1, extruded from the T die at 185° C. taken off at a draw ratio of 130% with a take-off roll at 65° C., preliminarily heated at 120° C. for 6 seconds, orientated 6 times in the transverse direction using a tenter at a first zone temperature 110° C., a second zone temperature of 100° C. and an orientation rate of 4500%/min, annealed in the vicinity of the exit of the tenter at 105° C. over a period of 3 seconds while relaxing the film by 3% in the widthwise direction, and subjected to primary cooling by air at 85° C. and then to secondary cooling with a cooling roll at 35° C.

In the obtained film, the inner and outer layers (A) and (B) were each 7 μm thick and the intermediate layer (C) was 46 μm thick. The total thickness of the film was 60 μm.

The relation between the heat shrinkage percentage Y and the heat shrinkage time t of the obtained film is expressed by the following Equation 11. FIG. 5 shows the correlation diagram of Equation 11, and FIG. 4 the correlation diagram of the gradient Y'. FIGS. 4 and 5 reveal that Equation 11 is outside Areas A and B.

$$Y' = -0.250t^2 + 3.50t + 4.750 \quad \text{(Equation 10)}$$

The film was provided with printing and center sealing in the same manner as in Example 1 and cut into the same length as in Example 1, giving a label. The label was heat shrunk at 80° C. for 5 seconds in the same manner as in Example 2.

Table 1 shows the finish conditions of the shrunk label and the change in height of the fill point. It is apparent from Table 1 that the label obtained in this example had poor finish conditions, owing to the fact that Equation 10 is outside Area B.

Comparative Example 2

The label obtained in Comparative Example 1 was heat shrunk at 88° C. for 5 seconds. The results are shown in Table 1. Table 1 reveals that the label had better finish conditions, but had a greater change in height of the fill point, which indicated that the PET bottle was deformed by the high temperature heat shrinkage.

Comparative Example 3

A heat shrinkable film was prepared in the following manner, using a resin system for the inner and outer layers (A) and (C) consisting of 100 parts by weight of the same styrene-butadiene block copolymer as used in Example 1 and 10 parts by weight of a styrene homopolymer, and a high impact polystyrene resin for forming the intermediate layer (B). The resin systems were laminated using the same film forming apparatus as used in Example 1, extruded from the T die at 195° C. and taken off at a draw ratio of 105% with a take-off roll at 35° C. The obtained film was orientated 6 times in the machine direction using a bench-scale orientation apparatus at 90° C. and an orientation rate of 5300%/min.

In the obtained film, the inner and outer layers (A) and (C) were each 3 μm thick and the intermediate layer (B) was 44 μm thick. The total thickness of the film was 50 μm.

The relation between the heat shrinkage percentage Y and the heat shrinkage time t of the obtained film is expressed by the following Equation 11. FIG. 5 shows the correlation diagram of Equation 11, and FIG. 4 the correlation diagram of the gradient Y'. FIGS. 4 and 5 reveal that Equation 11 is outside Areas A and B.

$$Y'=-1.125t^2+14.50t+33.625 \qquad \text{(Equation 11)}$$

The film was provided with center sealing so that the machine direction of the film became parallel to the circumferencial direction, and cut into the same length as in Example 1, giving a label. The label was heat shrunk at 80° C. for 5 seconds in the same manner as in Example 2.

Table 1 shows the finish conditions of the shrunk label and the change in height of the fill point. It is apparent from Table 1 that the label obtained in this example had poor finish conditions, owing to the fact that Equation 11 is outside Areas A and B.

EXAMPLE 3

In an extruder was melted a resin system consisting of 100 parts by weight of a copolymerized polyester resin containing terephthalic acid (77 mol %), isophthalic acid (13 mol %) and adipic acid (10 mol %) as dicarboxylic acid components and ethylene glycol (94 mol %) and neopentyl glycol (6 mol %) as diol components, 30 parts by weight of a polyester resin containing terephthalic acid as a dicarboxylic acid component and butanediol as a diol component, 50 parts by weight of a copolymerized polyester resin containing terephthalic acid as a dicarboxylic acid component and ethylene glycol (70 mol %) and 1,4-cyclohexane dimethanol (30 mol %) as diol components, and 20 parts by weight of a polyethylene terephthalate resin. The molten resin was extruded from a T die at 270° C., taken off with a take-off roll at 20° C. so that the film passed through the take-off roll had a birefringence of 1.65 or less. The film was then orientated 1.3 times in the machine direction with an orientation roll at 90° C. and an orientation rate of 12000%/min, preliminarily heated at 85° C. for 5 seconds, and orientated 5 times in the transverse direction using a tenter at a first zone temperature of 95° C., a second zone temperature of 90° C. and an orientation rate of 5000%/min. The orientated film was then annealed in the vicinity of the exit of the tenter to 80 to 60° C. over a period of 5 seconds while relaxing the film by 1.5% in the widthwise direction, and cooled with a cooling roll at 25° C., giving a 50 μm thick heat shrinkable film.

The film had a natural shrinkage percentage of 1%. The relation between the heat shrinkage percentage Y and heat shrinkage time t of the obtained film is expressed by the following Equation 12. FIG. 5 shows the correlation diagram of Equation 12, and FIG. 4 the correlation diagram of the gradient Y'. FIGS. 4 and 5 reveal that Equation 12 is in Areas A and B according to the invention.

$$Y'=-0.625t^2+6.50t+17.125 \qquad \text{(Equation 12)}$$

The heat shrinkable film was provided with printing and center sealing in the same manner as in Example 1, and cut in the same length as in Example 1 to give a label. The label was heat shrunk at 80° C. for 5 seconds in the same manner as in Example 2.

Table 1 shows the finish conditions of the shrunk label and the change in height of the fill point.

TABLE 1

|  | Finish conditions | Change in height of fill point (mm) |
|---|---|---|
| Ex. 2 | Good | <0.1 |
| Comp. Ex. 1 | Poor (insufficient shrinkage occurrence of wrinkles) | — |
| Comp. Ex. 2 | Good | 2.5 |
| Comp. Ex. 3 | Poor (occurrence of pockmarks and tucking) | — |
| Ex. 3 | Good | <0.1 |

The present invention is carried out in the mode as described above, and has the following advantages.

Labels can be obtained which show proper shrinking properties at low temperatures (70 to 84° C.) and which are advantageous to maintain the quality of products, when the heat shrinkable film is a film comprising at least one layer of a thermoplastic resin, in whose correlation diagram showing the relation between the heat shrinkage percentage Y at 80° C. in one direction and the heat shrinkage time t ($1 \leq t \leq 5$), the gradient Y' is in the area between the gradients satisfying Equations 1 and 2 and the heat shrinkage percentage Y is in the area between the heat shrinkage percentages satisfying Equations 3 and 4.

When the heat shrinkable film for labeling comprises an intermediate layer (B) containing at least one resin selected from the group consisting of polystyrene resins, high impact polystyrene resins and high impact graft polystyrene resins, and inner and outer layers (A) and (C) comprising a specific mixed resin system of specific proportions of a styrene-butadiene block copolymer and a polystyrene resin, the layers being laminated in the order (A)/(B)/(C), the obtained label not only shows proper shrinking properties at low temperatures (70 to 84° C.) but also has excellent impact resistance, good stiffness and a small natural shrinkage percentage.

When the heat shrinkage film for labeling comprises a thermoplastic polyester resin, the obtained label not only shows proper shrinking properties at low temperatures (70 to 84° C.) but also has excellent impact resistance, good stiffness and a small natural shrinkage percentage.

When a UV absorber is added to obtain a film having a maximum light transmission of 25% or less in the wavelength range of 250 to 380 nm, products labeled with the film can be protected from deterioration, change in quality and discoloration caused by UV light.

If the UV absorber is added only to the intermediate layer (B) in the multi-layer polystyrene film, sufficient UV absorbing properties can be achieved by addition of only a small amount of the UV absorber.

What is claimed is:

1. A heat shrinkable film for labeling comprising at least one layer of a thermoplastic resin, in whose correlation diagram showing the relation between the heat shrinkage percentage Y at 80° C. in one direction and the heat shrinkage time t ($1 \leq t \leq 5$), the gradient Y' is in the area between the gradients satisfying Equations 1 and 2 and the heat shrinkage percentage Y is in the area between the heat shrinkage percentages satisfying Equations 3 and 4:

$Y'=-1.05t^2+12.05t$ (Equation 1)

$Y'=-0.30t^2+2.90t$ (Equation 2)

$Y=-1.05t^2+12.05t+40$ (Equation 3)

$Y=-0.30t^2+2.90t+9$ (Equation 4).

2. A heat shrinkable film according to claim 1, which comprises a thermoplastic polyester resin.

3. A heat shrinkable film according to claim 1, which comprises an intermediate layer (B) including at least one resin selected from the group consisting of polystyrene resins, high impact polystyrene resins and high impact graft polystyrene resins, and inner and outer layers (A) and (C) each comprising a resin system mainly comprising a styrene-butadiene block copolymer, the layers being laminated in the order (A)/(B)/(C).

4. A heat shrinkable film according to claim 3, wherein the inner and outer layers (A) and (C) each comprise a mixed resin system of 100 parts by weight of a styrene-butadiene block copolymer having a butadiene content of 10 to 40 wt. % and 2 to 100 parts by weight of a polystyrene resin.

5. A heat shrinkable film according to claim 3 or 4, wherein the intermediate layer (B) further comprises a UV absorber.

6. A heat shrinkable film according to any one of claims 1, 2, 3, or 4, wherein the film has a maximum light transmission of 25% or less in the wavelength range of 250 to 380 nm.

7. A heat shrinkable film according to claim 5, wherein the film has a maximum light transmission of 25% or less in the wavelength range of 250 to 380 nm.

8. A method for affixing a heat shrinkable film, comprising:

applying a film according to any one of claims 1, 2, 3, or 4 to a container amenable to labeling by heat shrinkage at 70 to 84° C., and heat shrinking the film at a temperature of 70 to 84° C.

9. A method for affixing a heat shrinkable film, comprising:

applying a film according to claim 5 to a container amenable to labeling by heat shrinkage at 70 to 84° C., and heat shrinking the film at a temperature of 70 to 84° C.

10. A method for affixing a heat shrinkable film, comprising:

applying a film according to claim 6 to a container amenable to labeling by heat shrinkage at 70 to 84° C., and heat shrinking the film at a temperature of 70 to 84° C.

11. A method for affixing a heat shrinkable film, comprising:

applying a film according to claim 7 to a container amenable to labeling by heat shrinkage at 70 to 84° C., and heat shrinking the film at a temperature of 70 to 84° C.

12. A packaged article obtainable by affixing a film according to any one of claims 1, 2, 3, or 4 to a container by heat shrinkage.

13. A packaged article obtainable by affixing a film according to claim 5 to a container by heat shrinkage.

14. A packaged article obtainable by affixing a film according to claim 6 to a container by heat shrinkage.

15. A packaged article obtainable by affixing a film according to claim 7 to a container by heat shrinkage.

* * * * *

UNITED STATES PATENT AND TRADEMARK OFFICE
CERTIFICATE OF CORRECTION

PATENT NO. : 6,270,866 B1
DATED : August 7, 2001
INVENTOR(S) : Okuda et al.

It is certified that error appears in the above-identified patent and that said Letters Patent is hereby corrected as shown below:

Column 3,
Line 59, "themo-" should read -- thermo- --

Column 5,
Line 20, "component" should read -- components --

Column 6,
Lines 54-63, should be deleted as redundant in view of the identical language disclosed in Column 7, lines 37-46.
Lines 64-65, should be deleted as redundant in view of the identical language disclosed in Column 7, lines 54-55.

Column 7,
Line 4, "terephtharic" should read -- terephthalic --
Line 18, "docholinedicarboxylic" should read -- dicholinedicarboxylic --
Line 49, "themoplastic" should read -- thermoplastic --
Column 7, line 64– Column 8, line 6,
Should be deleted as redundant in view of the identical language disclosed in Column 7, lines 37-46.

Column 8,
Lines 7-8, should be deleted as redundant in view of the identical language disclosed in Column 7, lines 54-55.

Column 10,
Line 26, "0.3 kg/cm2)" should read -- 0.3 kg/cm$^2$) --
Line 60, "Equation 11." should read -- Equation 10. --
Line 61, "Equation 11," should read -- Equation 10, --
Line 62, "FIGS. 4 and 5" should read -- FIG. 5 --; and "Equation 11" should read -- Equation 10 --
Line 63, "Areas A and B." should read -- Area A. --

Column 11,
Line 46, "ferencial" should read -- ferential --

Column 12,
Table 1, "shrinkage" should read -- shrinkage, --

UNITED STATES PATENT AND TRADEMARK OFFICE
CERTIFICATE OF CORRECTION

PATENT NO.   : 6,270,866 B1
DATED        : August 7, 2001
INVENTOR(S)  : Okuda et al.

It is certified that error appears in the above-identified patent and that said Letters Patent is hereby corrected as shown below:

Column 13,
Line 5, "shrinkage" should read -- shrinkable --

Signed and Sealed this

Twenty-second Day of October, 2002

Attest:

Attesting Officer

JAMES E. ROGAN
Director of the United States Patent and Trademark Office